United States Patent [19]
Goldman et al.

[11] Patent Number: 5,974,461
[45] Date of Patent: Oct. 26, 1999

[54] METHOD FOR AUTOMATICALLY REGENERATING INFORMATION AT A CLIENT SYSTEM IN THE EVENT OF POWER OR COMMUNICATION DISRUPTION BETWEEN THE CLIENT SYSTEM AND THE SERVER

[75] Inventors: Phillip Y. Goldman, Los Altos; Bruce A. Leak, Palo Alto; John Matheny, San Francisco, all of Calif.

[73] Assignee: WebTV Networks, Inc., Mountain View, Calif.

[21] Appl. No.: 08/900,394

[22] Filed: Jul. 21, 1997

Related U.S. Application Data

[63] Continuation-in-part of application No. 08/660,088, Jun. 3, 1996, which is a continuation-in-part of application No. 08/656,924, Jun. 3, 1996.
[51] Int. Cl.$^6$ .................................................. G06F 15/16
[52] U.S. Cl. ................................. 709/224; 713/340
[58] Field of Search ..................... 395/200.53, 200.52, 395/200.54, 200.47; 709/224, 223, 250, 217, 231, 232, 228, 227, 226, 219, 218, 203, 200; 713/340

[56] References Cited

U.S. PATENT DOCUMENTS

| | | | |
|---|---|---|---|
| 5,325,423 | 6/1994 | Lewis | 379/90 |
| 5,488,411 | 1/1996 | Lewis | 348/8 |
| 5,530,852 | 6/1996 | Meske, Jr. et al. | 395/600 |
| 5,538,255 | 7/1996 | Barker | 463/41 |
| 5,564,001 | 10/1996 | Lewis | 395/154 |
| 5,570,295 | 10/1996 | Isenberg et al. | 379/90.01 |
| 5,612,730 | 3/1997 | Lewis | 348/8 |
| 5,619,716 | 4/1997 | Nonaka et al. | 395/712 |
| 5,752,042 | 5/1998 | Cole et al. | 395/712 |
| 5,754,771 | 5/1998 | Epperson et al. | 395/200.33 |
| 5,796,393 | 8/1998 | MacNaughton et al. | 345/329 |

*Primary Examiner*—Mehmet B. Geckil
*Attorney, Agent, or Firm*—Workman, Nydegger, Seeley

[57] ABSTRACT

A method and computer program product for automatically regenerating information at a client system without user intervention in the event of power disruption or disruption in communication between the client system and a server. A first communication session is established between the client system and the server. The status of the power connection of the client system is monitored as well as monitoring the status of the communication link between the client system and the server. If there is no disruption in the power connection or communication link at the client system, the server automatically downloads data blocks from the server for storage at the client system. On the other hand, if the power connection or communication link is disrupted, a sustaining device is enabled to ensure that writing of any current block of data from the server is completed, and thereafter, upon resuming power or the communication link at the client system, the server then resumes downloading of only those remaining data blocks from the server that had not been downloaded at the time of disruption.

17 Claims, 12 Drawing Sheets

METHOD FOR AUTOMATICALLY REGENERATING INFORMATION AT A CLIENT SYSTEM IN THE EVENT OF POWER OR COMMUNICATION DISRUPTION BETWEEN THE CLIENT SYSTEM AND THE SERVER

CROSS REFERENCE TO PARENT APPLICATION

This application is a continuation-in-part of copending U.S. patent application Ser. No. 08/660,088, filed on Jun. 3, 1996, which is a continuation-in-part of copending U.S. patent application Ser. No. 08/656,924, filed on Jun. 3, 1996.

FIELD OF THE INVENTION

This invention relates generally to improvements in computer networks, and more particularly, to a system and method for the automatic regeneration of user data from a network.

BACKGROUND OF THE INVENTION

The number of homes and businesses using personal computers has increased substantially in recent years, and along with this increase has come an explosion in the use of the Internet, and particularly the World-Wide Web ("the Web"). The Web is a collection of formatted hypertext pages located on numerous computers around the world that are logically connected by the Internet. Although "the Web" has in the past been a source of primarily scientific and technical information, it is now a valuable resource for information relating to almost any subject, including business, entertainment, travel, and education, to name just a few. Advances in network technology, and especially in software such as "Web browsers" (software applications which provide a user interface to the Web), have made the Web accessible to a large segment of the population. However, despite the growth in the development and use of the Web, many people are still unable to take advantage of this important resource.

Access to the Web has been limited to people who have access to a personal computer. Yet some people cannot afford the cost of even a relatively inexpensive personal computer, while others are unable or unwilling to learn the basic computer skills that are required to access the Web. Furthermore, Web browsers in the prior art generally do not provide the degree of user-friendliness desired by some people who lack computer experience, and many computer novices do not have the patience to learn how to use the software. Some people, for example, dislike an interface which requires them to identify hypertext objects and use the point-and-click technique to browse through Web pages.

Most people, however, feel quite comfortable using a remote control to operate a television set. Therefore, it would be desirable to allow a person to access the World-Wide Web without the use of a personal computer. In particular, it would be desirable for a person to be able to access and navigate through Web pages using an ordinary television set and a remote control. It would further be desirable to have a user interface by which a person can use a remote control to navigate between hypertext objects on a Web page with minimal effort or thought, so that a person feels more as if he or she is simply changing television channels rather than utilizing a complex computer network.

In addition to deficiencies in user interfaces, another problem commonly associated with Web browsing is communications latency. People commonly experience long, frustrating delays when browsing the Web. There are many possible causes for latency, such as heavy communications traffic on the Internet, slow response of remote servers, or the need to download very large files, as in the case of many images or audio files. Therefore, what is needed is a means for reducing such latency to eliminate some of the frustration which typically has been associated with Web browsing.

Another problem encountered by computer users in general is that software applications tend to become outdated quickly. Accordingly, software suppliers periodically produce upgrades, which are often distributed in the same way that the original software was distributed, such as on magnetic or optical disks or other similar storage devices. However, the distribution of software upgrades on storage media such as these has disadvantages. For example, it is inconvenient and sometimes annoying for the user to have to repeatedly install software upgrades, which can be a time-consuming process. Further, a user may not be aware that an upgrade is available or necessary, or he may forget to obtain or install the upgrade. The failure to install an upgrade or a delay in installing an upgrade can be detrimental, since the upgrade may add valuable new features to the software or remedy a bug (error) in the software. Therefore, what is needed is a technique for allowing a software upgrade to be automatically provided over a network in a manner which requires little or no effort on the part of the user.

A further problem encountered in computer networks is initializing and maintaining the accuracy of configuration information at the user sites. For example, a user's computer may store information related to local telephone access numbers, modem settings, and a user identifier and password. This configuration information must be initialized and maintained in the event that a user is accessing the system for the first time, or in the event that the user's session was interrupted by a power failure or some other unexpected interruption of service. Therefore, what is needed is a technique for initializing and maintaining user data automatically over a network in a manner which requires little or no effort on the part of the user.

SUMMARY OF THE INVENTION

A method and computer program product for automatically regenerating information at a client system without user intervention in the event of power disruption or disruption in communication between the client system and a server. A first communication session is established between the client system and the server. The status of the power connection of the client system is monitored as well as monitoring the status of the communication link between the client system and the server, If there is no disruption in the power connection or communication link at the client system, the server automatically downloads data blocks from the server for storage at the client system. On the other hand, if the power connection or communication link is disrupted, a sustaining device is enabled to ensure that writing of any current block of data from the server is completed, and thereafter, upon resuming power or the communication link at the client system, the server then resumes downloading of only those remaining data blocks from the server that had not been downloaded at the time of disruption.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF A PREFERRED EMBODIMENT OF THE PRESENT INVENTION

In the following description of a preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. A preferred embodiment of the present invention, described below, enables a remote computer system user to execute a software application on a network file server.

A method and apparatus for performing a remote upgrade of software over a network are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description.

In one embodiment, steps according to the present invention are embodied in machine-executable software instructions, and the present invention is carried out in a processing system by a processor executing the instructions, as will be described in greater detail below. In other embodiments, hardwired circuitry may be used in place of, or in combination with, software instructions to implement the present invention.

The present invention relates to a system in which a set-top box is connected to a television and to one or more servers over the Internet. The set-top box includes a processing system that executes browser software to enable a user to browse through World-Wide Web pages displayed on the television using a remote control device. As will be described below, the browser is upgraded or reconfigured by downloading to the set-top box replacement software or data transmitted from a server over the network and then writing the replacement software or data into a programmable, non-volatile memory in the set-top box.

In one embodiment, the present invention is included in a system known as WebTV™ (WebTV), which uses a standard television set as a display device for browsing the Web and which connects to a conventional network, such as the Internet, using standard telephone, ISDN, or similar communication lines. In accordance with the present invention, a user of a WebTV client system can utilize WebTV network services provided by one or more remote WebTV servers. The WebTV network services are used in conjunction with software running in a WebTV client system to browse the Web, send electronic mail, and to make use of the Internet in various other ways. The WebTV servers function as proxies by retrieving, from a remote server, Web pages or other data requested by a WebTV client system and then transmitting the requested information to the WebTV client system.

I. System Overview

Figure 1:
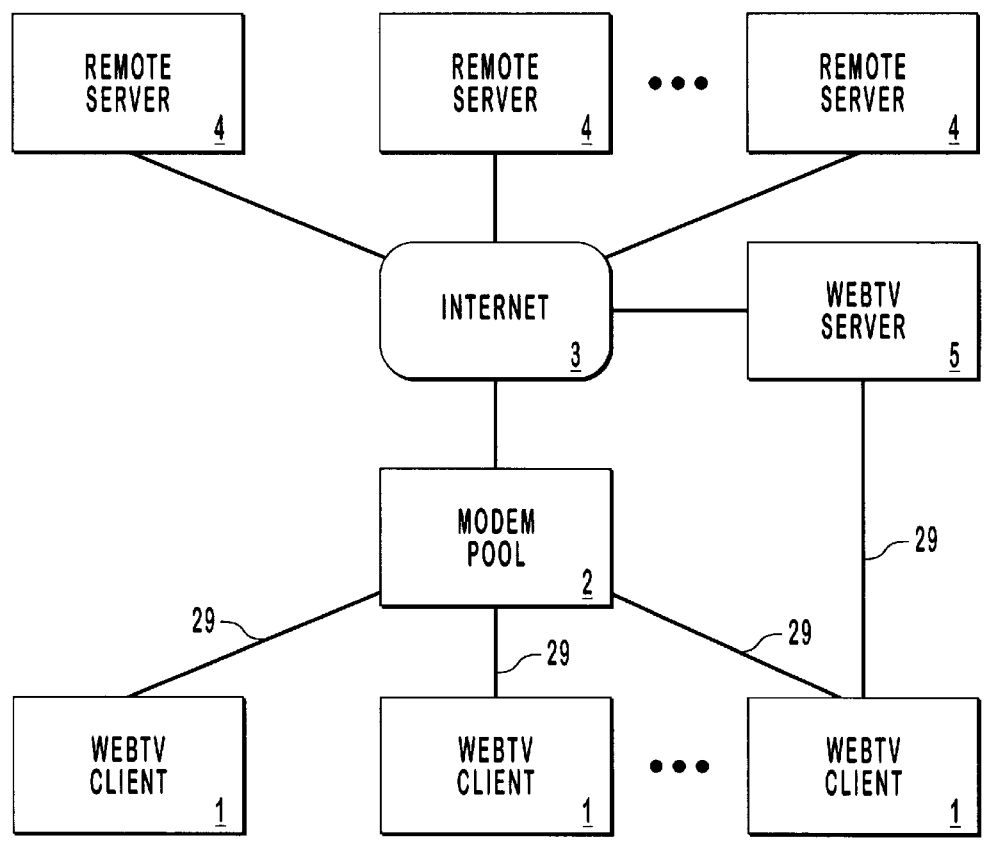
FIG. 1 illustrates several WebTV client systems connected to a WebTV server system.

FIG. 1 illustrates a configuration of the WebTV network according to one embodiment. A number of WebTV clients 1 are coupled to a modem pool 2 via direct-dial, bi-directional data connections 29, which may be telephone (POTS, i.e., "plain old telephone service"), ISDN (Integrated Services Digital Network), or any other similar type of connection. The modem pool 2 is coupled typically through a router, such as that conventionally known in the art, to a number of remote servers 4 via a conventional network infrastructure 3, such as the Internet. The WebTV system also includes a WebTV server 5, which specifically supports the WebTV clients 1. That is, the server 5 provides the WebTV services to the WebTV clients 1. Each of the clients 1 can connect to the server 5 either through direct telephone or ISDN connection or through the Internet 3 via the modem pool 2. Note that the modem pool 2 is a conventional modem pool, such as those found today throughout the world providing access to the Internet and private networks. Modem pool 2 may be provided by a local Internet Service Provider (ISP).

A. Server System Architecture

Figure 2:
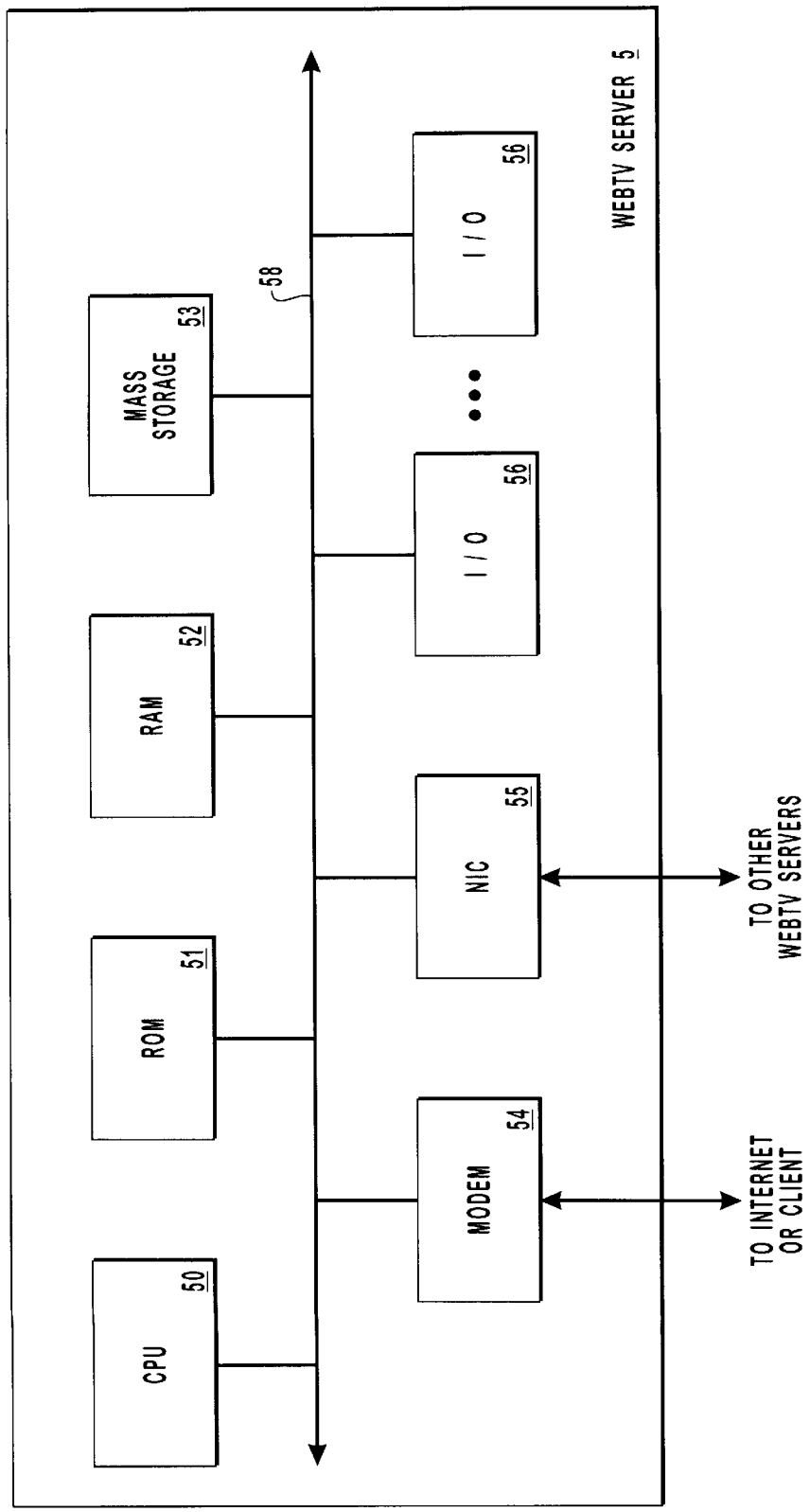
FIG. 2 illustrates a WebTV server system.

The WebTV server 5 generally includes one or more computer systems generally having the architecture illustrated in FIG. 2. It should be noted that the illustrated architecture is only exemplary; a WebTV server is not constrained to the illustrated architecture. The illustrated architecture includes a central processing unit (CPU) 50, random access memory (RAM) 51, read-only memory (ROM) 52, a mass storage device 53, a modem 54, a network interface card (NIC) 55, and various other input/output (I/O) devices 56. Mass storage device 53 includes a magnetic, optical, or other equivalent storage medium. I/O devices 56 may include any or all of devices such as a display monitor, keyboard, cursor control device, etc. Modem 54 is used to communicate data to and from remote servers 4 via the Internet.

As noted above, the server 5 may actually comprise multiple physical and logical devices connected in a distributed architecture. Accordingly, NIC 55 is used to provide data communication with other devices that are part of the WebTV services. Modem 54 may also be used to communicate with other devices that are part of the WebTV services and which are not located in close geographic proximity to the illustrated device.

B. Client System Architecture

Figure 3:
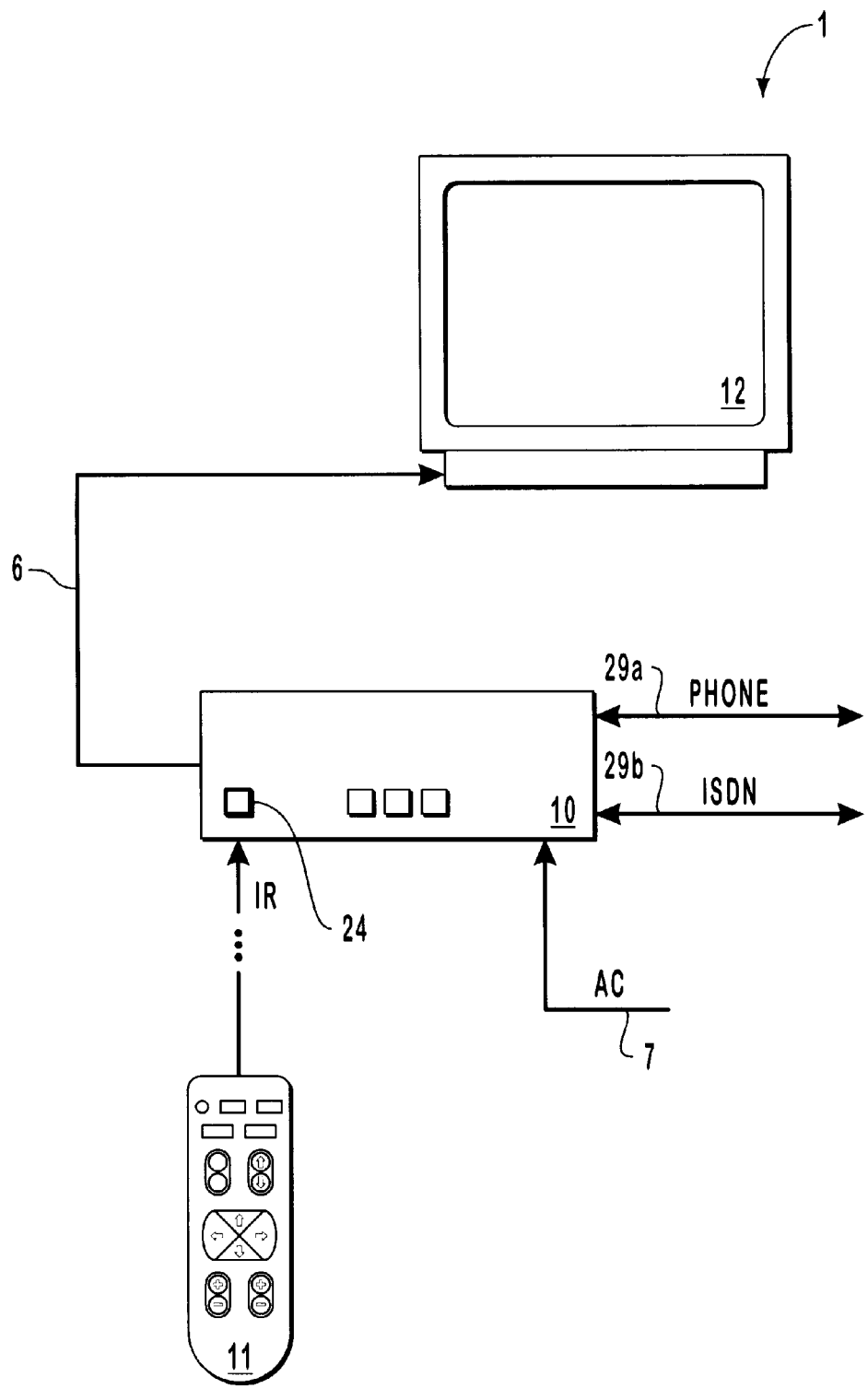
FIG. 3 illustrates a WebTV client system.

FIG. 3 illustrates a WebTV client system 1 according to one embodiment. The client system 1 includes an electronics unit 10 (hereinafter referred to as "the WebTV box 10" or "the box 10"), an ordinary television set 12, and a hand-held remote control 11. In an alternative embodiment of the present invention, the WebTV box 10 is built into the television set 12 as an integral unit. The box 10 includes hardware and software for providing the user with a graphical user interface, by which the user can access the WebTV network services, browse the Web, send e-mail, and otherwise access the Internet.

The WebTV client system 1 uses the television set 12 as a display device and an audio output device. The box 10 is coupled to the television set 12 by a link 6. The link 6 includes an audio channel for generating sound from the television's speaker and a video channel in the form of RF (radio frequency), S-video, composite video, or other format. The communication link 29 between the box 10 and the server 5 is either a telephone (POTS) connection 29a or an ISDN connection 29b. The box 10 receives AC (alternating current) power through an AC power line 7.

Remote control 11 is operated by the user in order to control the client system 1 to browse the Web, send e-mail, and perform other Internet-related functions. The box 10 receives commands from remote control 11 via an infrared (IR) communication link. In alternative embodiments, the link between the remote control 11 and the box 10 may be RF or any equivalent mode of transmission.

The box 10 includes application software which, when executed by a processor in the box 10, provides the user with a graphical user interface by which the user can access the WebTV network services and browse the Web. The application software is automatically executed upon application of power to the box 10.

Figure 4:
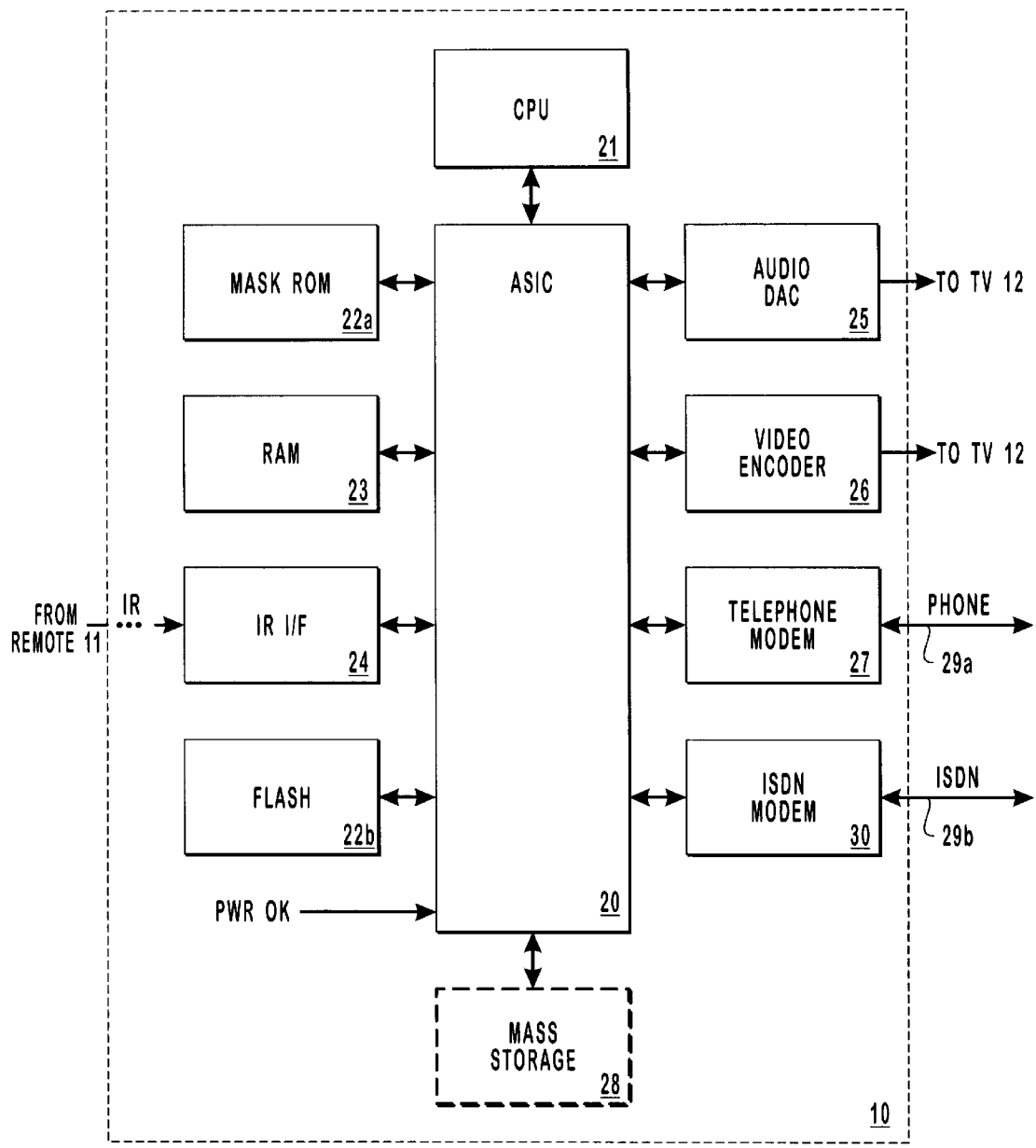
FIG. 4 is a block diagram of an electronics unit of a WebTV client system.

FIG. 4 shows the internal components of the WebTV box 10. Operation of the client system 1 is controlled by a CPU 21, which is coupled to an Application-Specific Integrated Circuit (ASIC) 20. The CPU 21 executes software designed to implement features of the present invention. ASIC 20 contains circuitry which is used to implement certain functions of the WebTV system. ASIC 20 is coupled to an audio digital-to-analog converter 25 which provides audio output to television 12. In addition, ASIC 20 is coupled to a video encoder 26 which provides video output to television set 12. An IR interface 24 detects IR signals transmitted by remote control 11 and, in response, provides corresponding electrical signals to ASIC 20. A standard telephone modem 27 and an ISDN modem 30 are coupled to ASIC 20 to provide connections 29a and 29b, respectively, to the modem pool 2 and, via the Internet 3, to the remote servers 4. Note that, while the illustrated embodiment includes both a telephone modem 27 and an ISDN modem 30, either one of these devices will suffice to practice the present invention. Further, in various other embodiments, the telephone modem 27 and the ISDN modem 30 each may be replaced by or supplemented with other communications devices, such as a cable television modem. In addition, in other embodiments, communication with the server 5 might be made via a token ring or Ethernet connection. Note that the box 10 also may include a cable television modem (not shown).

Also coupled to ASIC 20 is mask Read-Only Memory (ROM) 22a, a flash memory 22b, and a Random Access Memory (RAM) 23. Mask ROM 22a (which is so named because it is non-programmable) provides storage of certain program instructions and data, as will be described below. Flash memory 22b is a conventional flash memory device that can be written to (programmed) and erased electronically. Flash memory 22b provides storage of the browser software as well as data. In one embodiment, a mass storage device 28 is included in the WebTV box and coupled to ASIC 20. The mass storage device 28 may be used to input software or data to the client or to download software of data received over network connection 29. The mass storage device 28 includes any suitable medium for storing machine-executable instructions, such as magnetic disks, optical disks, and the like.

Figure 5:
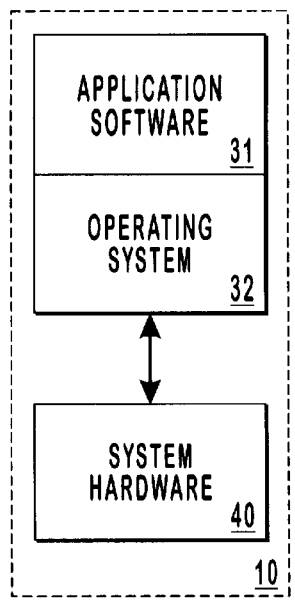
FIG. 5 illustrates the functional relationship between hardware and software in the client processing system of FIG. 1.

As mentioned above, the WebTV box 10 includes application software including a Web browser. Referring now to FIG. 5, the above-mentioned application software 31 operates in conjunction with operating system (OS) software 32. The OS software 32 includes various device drivers and otherwise provides an interface between the application software 31 and the system hardware components 40 (i.e., the elements illustrated in FIG. 4).

In one embodiment, the application software 31 and the OS software 32 are stored in flash memory 22b. It will be recognized, however, that some or all of either the application software 31 or the OS software 32 or both can be stored in any other suitable storage medium, such as mask ROM 22a or mass storage device 28, in various embodiments.

As mentioned above, steps according to the present invention are embodied in machine-executable instructions according to one embodiment. For example, in one embodiment the present invention is carried out in the WebTV box 10 by the CPU 21 executing sequences of instructions contained in mask ROM 22a, flash memory 22b, or RAM 23, or a combination of these devices. More specifically, execution of the sequences of instructions causes the CPU 21 to perform the steps of the present invention. These steps will be described below. Instructions for carrying out the present invention may be loaded into memory from a persistent store, such as mass storage device 28, and/or from one or more other computer systems over a network, such as the WebTV server 5 or a remote server 4. For example, such a server system may transmit a sequence of instructions to the client system 1 in response to a message transmitted to the server system over the Internet 3 by the client system 1. As the client system 1 receives the instructions via a network connection, such as modem 27a, the client system 1 stores the instructions in a memory. The client system 1 may store the instructions for later execution or execute the instructions as they arrive over the network connection.

In some embodiments, the downloaded instructions may be directly supported by the CPU 21. Consequently, execution of the instructions may be performed directly by the CPU 21. In other embodiments, the instructions may not be directly executable by the CPU 21. Under these circumstances, the instructions may be executed by causing the CPU 21 to execute an interpreter that interprets the instructions, or by causing the CPU 21 to execute instructions which convert the received instructions into instructions that can be directly executed by the CPU 21.

Certain embodiments and aspects of the present invention may be carried out in the WebTV server 5, instead of (or in addition to) being carried out in the WebTV client system 1. For example, the CPU 50 of the WebTV server 5 may execute instructions stored in memory to perform steps in accordance with the present invention.

In various embodiments, hardwired circuitry may be used in place of, or in combination with, software instructions to implement the present invention. Thus, the present invention is not limited to any specific combination of hardware circuitry and software, nor to any particular source for the instructions executed by a computer system.

II. Remote Download

As indicated above, the browser software can be upgraded or reconfigured by downloading to the box replacement software or data transmitted from a server via the Internet or via direct phone connection. The programmable nature of flash memory 22b and its ability to retain programmed information in the absence of power are used to advantage in performing such an upgrade or reconfiguration. As will be explained in greater detail below, replacement software or data transmitted from the WebTV server 5 (or another server designated by the WebTV server 5) is automatically written into the flash memory 22b in the WebTV box 10. In addition, the flash memory can be used to store various resources downloaded form the Web, such as Java applets (programs), so that such resources will be retained in the event of loss of power to the client system 1. Note that the present invention does not necessarily require use of a flash memory for these purposes; other forms of programmable non-volatile memory may be used, such as an electrically-erasable programmable ROM (EEPROM).

In one embodiment, the browser software of the WebTV system is stored in flash memory 22b to allow the software to be reconfigured. Data that is used by the software to generate the browser environment is generally stored in mask ROM 22a. This data includes various configuration parameters, such as fonts, images, sounds, telephone numbers for connecting to the server 5 or the modem pool 2, and connection scripts used to establish communication with the WebTV server 5, the modem pool 2 or other servers.

Data items in the mask ROM 22a can be overridden (superseded) by storing alternate ("override") data items in flash memory 22b. Thus, if a particular data item is present in flash memory 22b, the client system 1 will ignore the corresponding data item in mask ROM 22a. Hence, the browser can be upgraded or reconfigured by adding to or replacing computer program instructions stored in flash memory 22b, data stored in flash memory 22b, or both.

Certain types of flash memory are manufactured with a small number of so-called "boot blocks". Boot blocks generally are smaller in size than the standard blocks within the memory. For example, in one particular type of flash memory, the size of a single standard block of memory is 64 KBytes, while a typical boot block is 8 KBytes. Therefore, in one embodiment, certain override data or other data is stored in the boot blocks of the flash memory 22b. This technique avoids wasting large amounts of memory space when a single block of flash memory cannot be fully utilized.

A download from the Internet 3 can be performed for purposes of upgrading the WebTV client system 1 or reconfiguring the client system 1 to correct an inconsistent state (e.g., an error in the program instructions or data). The WebTV client system 1 determines whether a download from the network should take place each time the client system 1 is reset. More specifically, a download will be performed if, upon reset, the client system 1 detects an error condition or, in the case of an upgrade, the client system 1 finds a download request in memory. Accordingly, FIG. 6 illustrates a reset routine performed by the WebTV client system 1 according to one embodiment.

Figure 6:
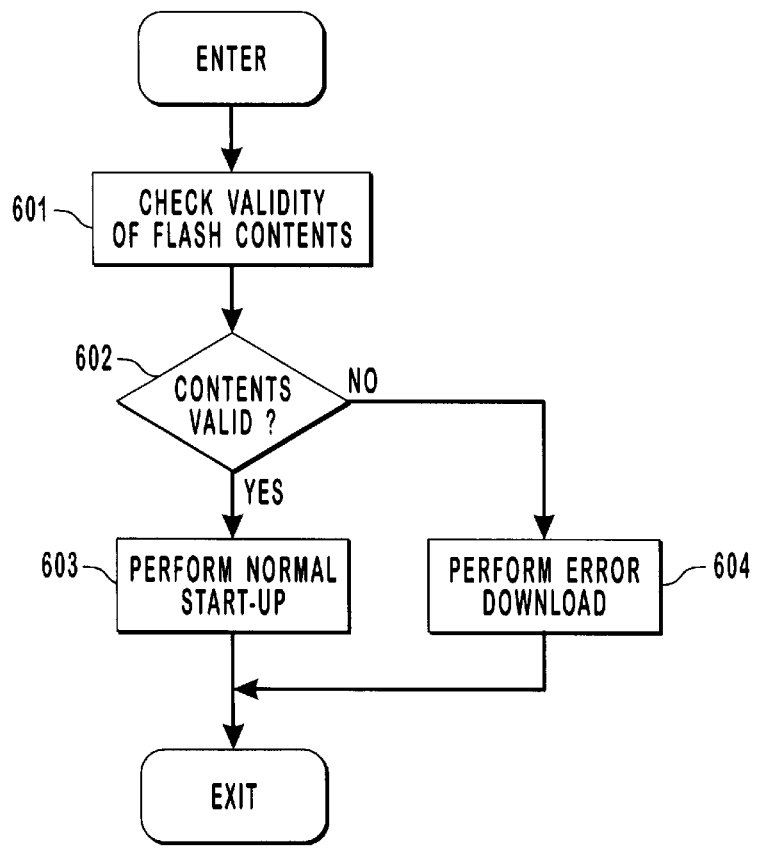
FIG. 6 is a flow diagram illustrating a reset routine for a WebTV client system.

The reset routine of FIG. 6 is performed any time the client system 1 is reset during operation or any time power to the box 10 is turned on. In one embodiment, the routine of FIG. 6 is performed by execution of start-up instructions stored in the mask ROM 22a. In step 601, the validity of all contents of the flash memory 22b (i.e., program instructions and data) are verified using a conventional checksum technique. If the contents are valid (step 602), then the normal start routine is performed in step 603. If the contents of flash memory 22b are not valid (i.e., are corrupted or otherwise found to represent an inconsistent state), then an error download routine is performed in step 604. In the error download routine, some or all of the corrupt information in the flash memory is replaced by correct information downloaded from the Internet 3. The error download routine is described further below. Thus, the WebTV system allows errors in the programming or data to be detected and automatically corrected by performing the error download routine, without intervention by the user of the WebTV client system 1.

Figure 7:
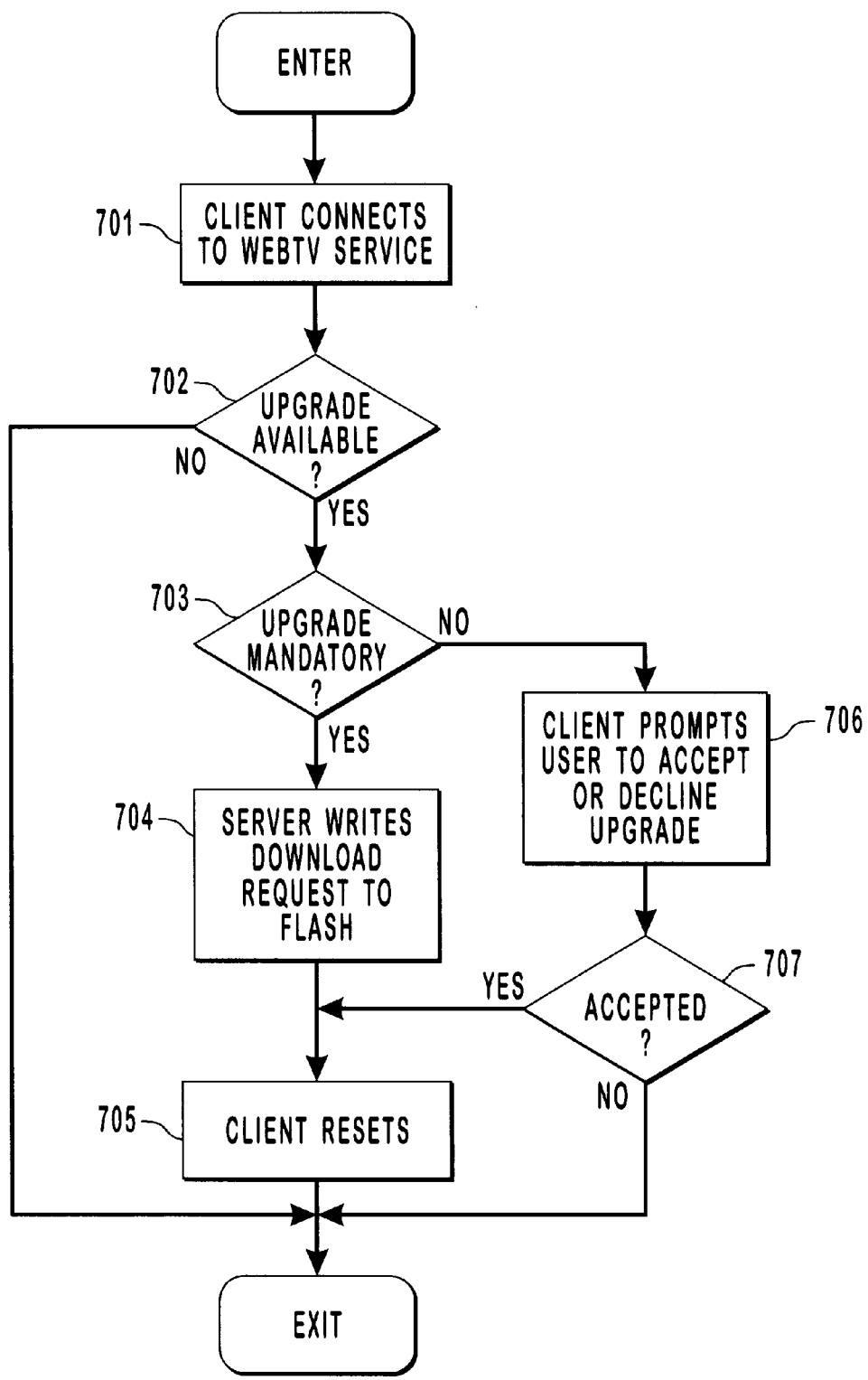
FIG. 7 is a flow diagram illustrating a normal start-up routine for initiating an upgrade of a WebTV client system over the network.

FIG. 7 illustrates a routine by which an upgrade of the Web browser is initiated. During a normal start-up (i.e., when no error was detected upon reset), the client system 1 automatically connects to the WebTV server 5 in step 701. Generally, this connection is made via the modem pool 2 by executing a connection script. If an upgrade is determined to be available in step 702, and the upgrade is designated as mandatory in step 703, then the server sends a command to the client system 1 to cause a download request to be written into the flash memory 22b of the client system 1 in step 704. The client system 1 is then commanded by the WebTV server 5 in step 705 to reset according to the routine of FIG. 6. If an upgrade is determined to be available in step 702, and the upgrade is not designated as mandatory in step 703, then the client system 1 prompts the user in step 706 to either accept or decline the upgrade. If the upgrade is accepted in step 707, then the client system 1 resets in step 705 according to the routine of FIG. 6. If not, the routine ends.

Figure 8:
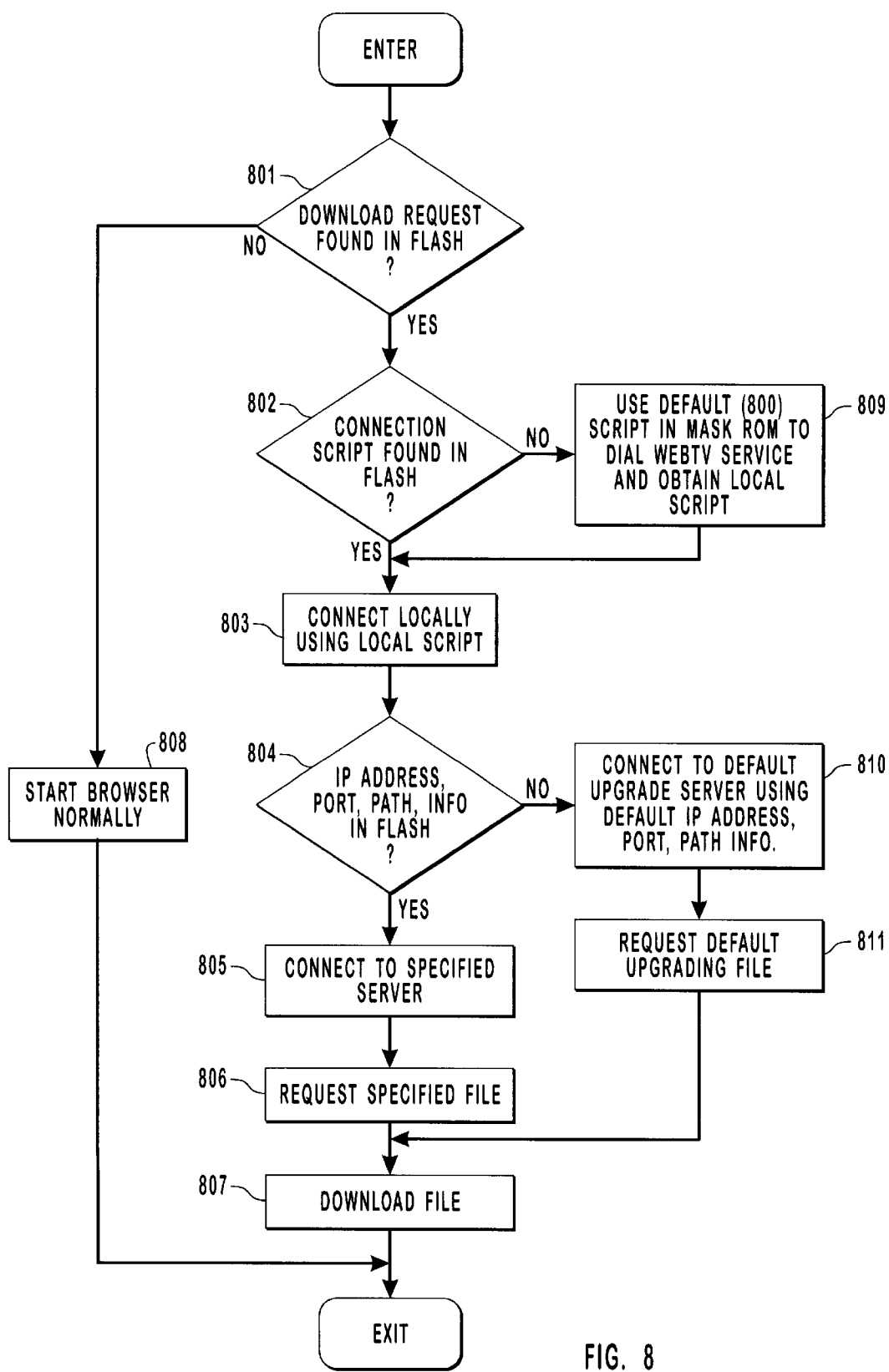
FIG. 8 is a flow diagram illustrating a routine for initiating a download for the purpose of upgrading a WebTV client system.

FIG. 8 illustrates a portions of the normal start-up routine (i.e., step 603 in FIG. 6) for initiating an upgrade. Initially, the client system 1 determines in step 801 whether a download request is present in flash memory 22b. If not, the browser program is started normally in step 808. If a download request is found in flash memory 22b, then it is next determined in step 802 whether a connection script is present in flash memory 22b.

As mentioned above, the connection script is executed to establish communication with the WebTV server 5 or the modem pool 2. Generally, a local connection script is stored in flash memory 22b to allow connection to the local modem pool 2. A default connection script is stored in mask ROM 22a, which allows direct connection to the WebTV server 5 using a toll-free (e.g., "1-800-") telephone number. The default connection script is generally used only if a local connection script is not found in flash memory 22b.

Referring still to FIG. 8, if the local connection script is found in flash memory 22b (step 802), then in step 803 the client system uses that connection script too connect to the WebTV server 5 via the local modem pool 2. Assuming such connection is made, a determination is then made in step 804 as to whether an IP (Internet Protocol) address, a port, and path information for the upgrade is stored in the flash memory 22b. The WebTV server 5 may provide such information to the client system 1 if the upgrade is to be downloaded from a server other than a default server, which may be the WebTV server 5. If such information has been provided, then the client system 1 connects to the specified server in step 805, requests the specified file in step 806, and initiates downloading of the file in step 807. If an IP address, port, and path are not found in flash memory 22b, then in step 810 the client system 1 connects to the default server using a default IP address, port, and path stored in mask ROM 22a. A default upgrade file is then requested using this stored information in step 811. In step 811, the client system 1 also indicates to the default server which version of software it is currently running, so that the default server can determine the proper default file for that client system. Downloading of the default file is initiated in step 807 after the client system has requested a file. As mentioned above, downloading to the client system 1 occurs via the Internet 3 via the modem pool 2. Once downloaded, the information is automatically decompressed (if compression was applied) and written into flash memory 22b by the client system 1.

Hence, an optional upgrade is performed automatically without any input from the user of the client system 1, other than the user's answering a prompt on whether to accept the upgrade. A mandatory upgrade is performed without any input from the user and, in fact, can be performed without informing the user, if desired.

Figure 9:
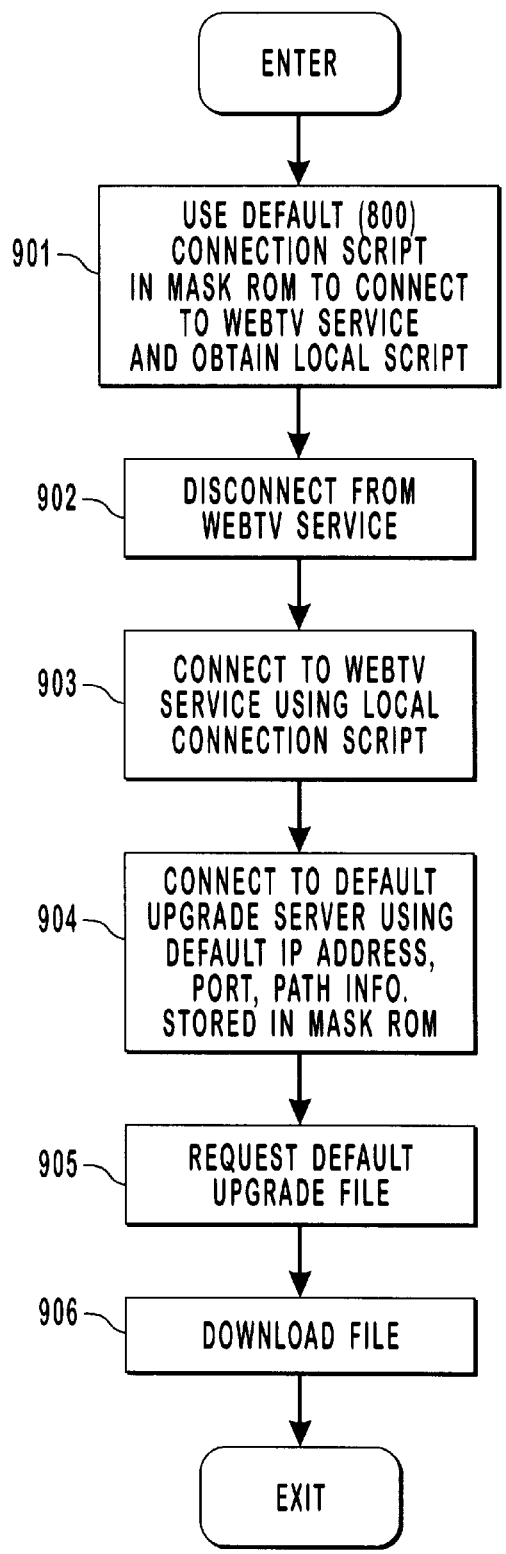
FIG. 9 is a flow diagram illustrating a routine for initiating a download to correct an error.

FIG. 9 illustrates a routine by which an error in the client system's programming or data can be automatically corrected, such as when an error or other inconsistent state is found during the reset routine (FIG. 6). It will be seen that such correction occurs automatically without any input from the user and, in fact, can occur without informing the user, if desired. Initially, in step 901 the client system 1 connects to the server 5 directly using the default toll-free number stored in mask ROM 22a. Once connected, the client system 1 obtains a local connection script from the server 5. The client system 1 then disconnects from the server 5 and then reconnects to the server 5 via the local modem pool 2 using the local connection script. The client system 1 then further establishes a connection to the default server in step 903 using the default IP address, port, and path stored in mask ROM 22a. In step 904, the client system 1 requests the default upgrade file from the default server using the default IP address, port, and path. In step 904, the client system 1 also indicates to the default server which version of software it is currently running, so that the default server can determine the proper default file for that client system. In step 905, the requested file is downloaded over the Internet 3. The downloaded file is then written into flash memory 22b.

Figure 10:
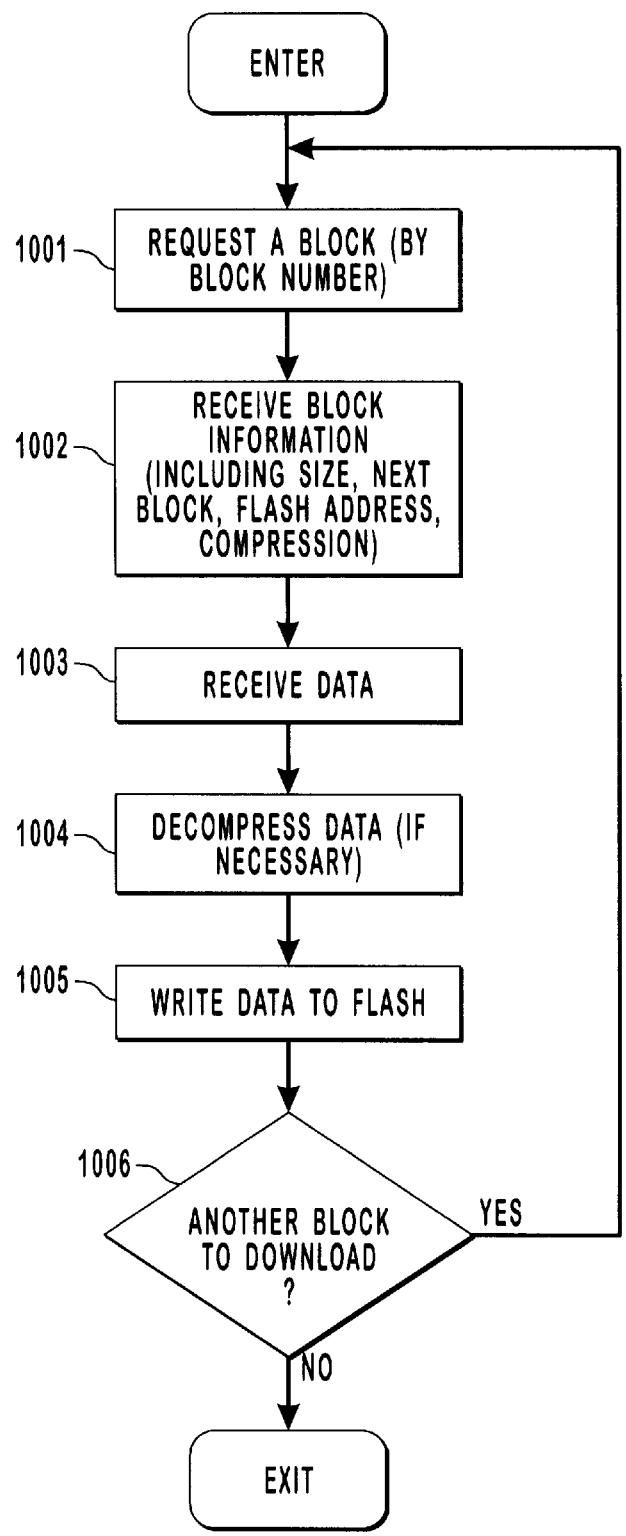
FIG. 10 is a flow diagram illustrating a routine for downloading to the WebTV system from the network.

FIG. 10 illustrates the downloading process in greater detail. When downloading is initiated, the client system 1 requests a block of data (which may actually comprise computer program instructions) by block number in step 1001. In step 1002, the client system 1 receives certain block information from the server that will transmit the data, including the size of the block to be downloaded, an identification of the next block to be downloaded, the address in flash memory 22b to which the current block is to be written, and a description of any data compression that is to be applied before transmission over the Internet 3. The data is then transmitted over the Internet 3 to the client system 1. In step 1003, the client system 1 receives the data via the network connection 29 and loads the data into RAM 23. In step 1004 the client system 1 decompresses the data, assuming data compression was used. In step 1005, the client system writes the data into flash memory 22b using the address received in step 1002. If there is another block to be downloaded according to the next block information (step 1006), the routine repeats from step 1001. Otherwise, the routine ends.

III. Caching of Web Resources

A problem associated with browsing the Web is communications latency. In prior art systems, long delays are commonly experienced, for example, when downloading images, audio data, or other resources that require large amounts of data. The present invention includes a technique for reducing such latency.

Certain Web resources will be accessed repeatedly and frequently by the client system 1. Such resources include, for example, the home page of the WebTV services, the WebTV logo, and formatting graphics for displays. Therefore, in accordance with the present invention, certain resources such as the aforementioned are cached in either the mask ROM 22a, flash memory 22b, or both. Resources that are cached in flash memory 22b can be added to, removed, or updated from the server 5 via the Internet or direct phone connection in the manner described above. Consequently, when a Web page containing such resources is requested by the client system 1, there is no need to download these resources from the Internet 3. Rather, these resources can be retrieved directly from mask ROM 22a or flash memory 22b, which can be accomplished much more quickly than downloading the resources from the network. As a result of this caching, the total amount of information to be downloaded in response to the request is reduced, so that the overall download time for the request is reduced.

The server 5 maintains knowledge at all times of what Web resources are cached in the client system 1. Therefore, when a request is received by the server 5 from the client system 1, the request is checked against the WebTV server's knowledge of what is cached. Any resources found to be cached in the client system will not be retrieved by server 5 from a remote server 4 or transmitted to the client system 1.

Figure 11:
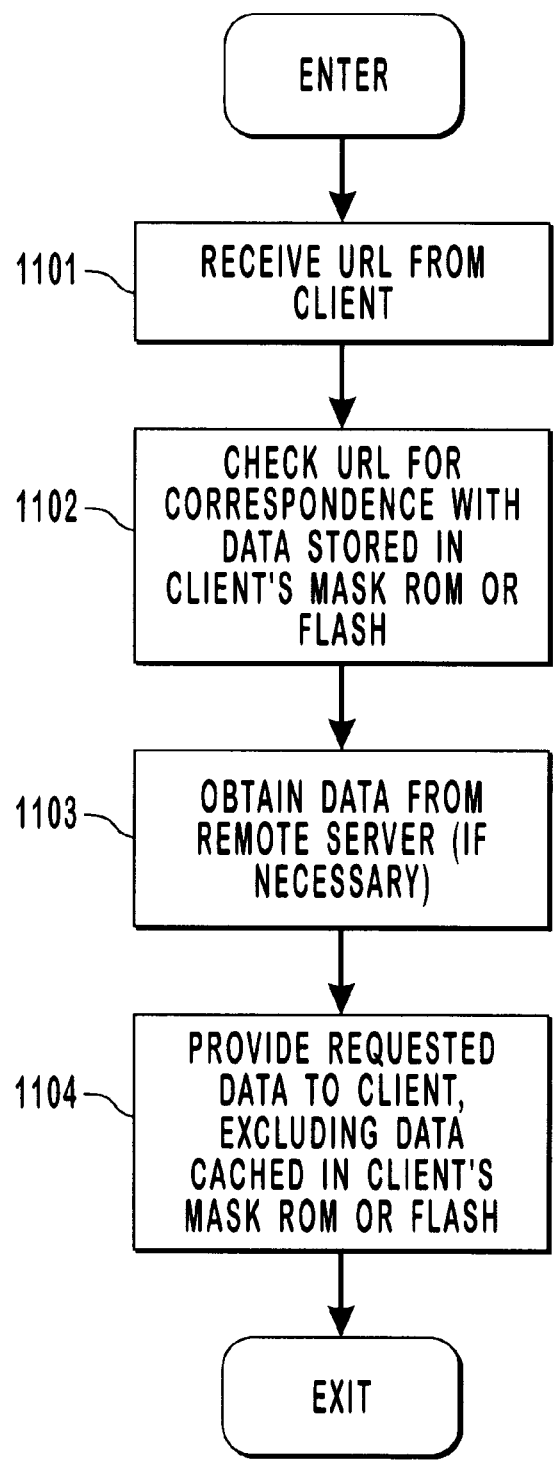
FIG. 11 is a flow diagram illustrating a routine for accessing Web resources cached in ROM.

FIG. 11 illustrates a routine performed by a WebTV server 5 in response to a request from the client system 1. Initially, in step 1101 the server 5 receives a Uniform Resource Locator (URL) from the client system 1 in response to the user of the client system 1 selecting a hypertext object. The server 5 then checks the received URL in step 1102 for correspondence with the cached data stored in either mask ROM 22a or flash memory 22b. In step 1103, the server 5 obtains the requested Web page (or other data) from the appropriate remote server 4. The requested Web page (or other data) is then downloaded to the client system 1 in step 1104, excluding any data that is known to be cached in the client system 1.

IV. Abutting Mask and Flash Memory Spaces

Because the client system 1 includes both mask ROM 22a and flash memory 22b, memory usage can be allocated between these two devices in a manner that is advantageous for operation of the client system 1. In particular, Flash memory and mask ROM each generally have advantages and disadvantages. For example, while flash memory is more flexible than mask ROM due to its programmability, flash memory also tends to be more expensive than mask ROM. Therefore, in one embodiment of the present invention, these characteristics are used to advantage by storing some of the browser code (software and data) in mask ROM 22a and some of the browser code in flash memory 22b. More specifically, the portions of the code which will are not likely to change as a result of an upgrade or reconfiguration are stored in mask ROM 22a, while portions of the code which are considered likely to be upgraded or reconfigured are stored in flash ROM 22b. The result in one embodiment is that most of the browser code (e.g., the code representing the core functions) is stored in mask ROM 22a, such that the amount of flash memory required is kept relatively small. This manner of memory allocation takes advantage of both the lower cost of mask ROM and the flexibility of flash memory. However, the browser can still be easily updated or reconfigured over the Internet by downloading to the flash memory 22b in the manner described above.

Figure 12:
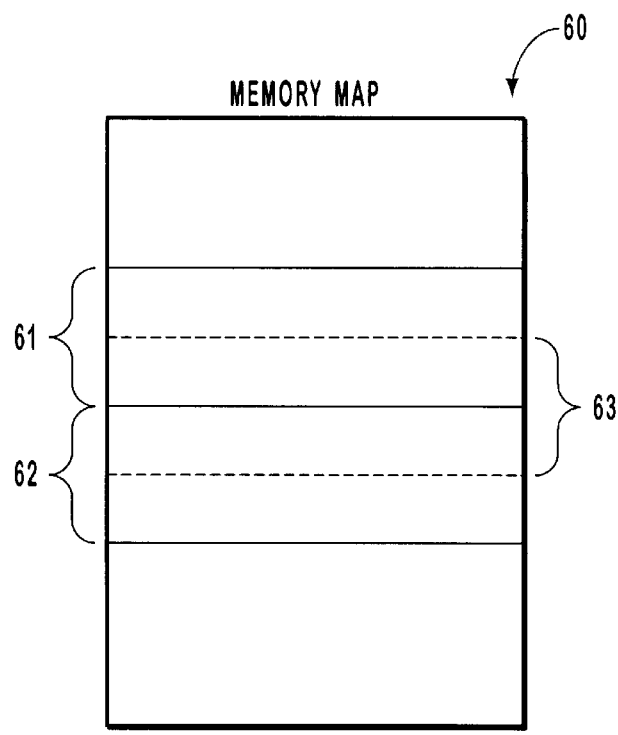
FIG. 12 illustrates a partial memory map of a WebTV client system.

Memory space can further be allocated efficiently by assigning mask ROM 22a and flash memory 22b adjacent memory spaces in the WebTV client system's memory map. As illustrated in FIG. 12, adjacent memory spaces 61 and 62 in the memory map 60 of the client system 1 can be assigned to the flash memory 22b and the mask ROM 22a, respectively. Further, the browser code can be stored in adjacent subsets of memory spaces 61 and 62, if desired, such that the browser code occupies a single, contiguous subset 63 of the memory map 60.

V. Recovery from Power Loss

It is possible that AC power to the WebTV box 10 may be temporarily lost at some point during operation of the system, such as due to the AC power cord being accidentally unplugged. The present invention therefore provides a technique for responding to and recovering from a loss of power that occurs while a download is taking place. The recovery technique also applies to a disruption in, or loss of, communication with the transmitting server.

Figure 13:
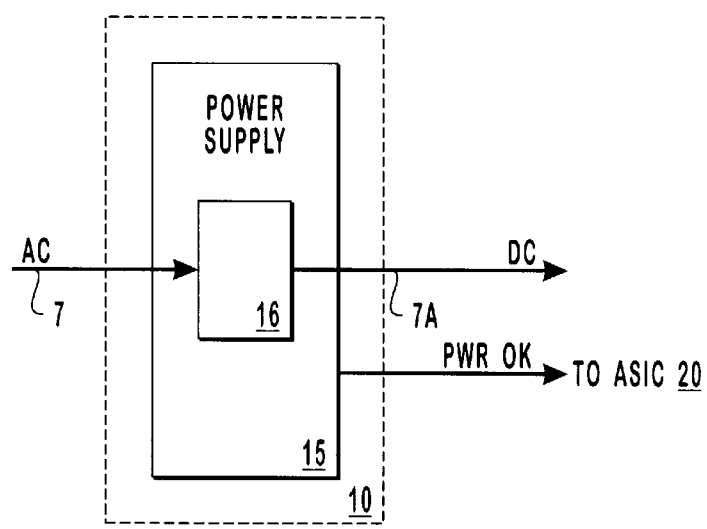
FIG. 13 illustrates a power supply of a WebTV client system.

In addition to the components shown in FIG. 4, the WebTV box 10 also includes a power supply 15, as shown in FIG. 13. The power supply 15 receives AC power via line 7 and outputs DC power to the various components of the box 10 via line 7A. In accordance with one embodiment of the present invention, the power supply 15 includes a sustaining device 16, which maintains adequate DC power to operate the client system 1 for a short period of time (e.g., one to two seconds) in the event of a loss of power on AC power line 7. More specifically, sustaining device 16 maintains power long enough to complete the writing of one block of downloaded data into flash memory 22b. This amount of time will vary, depending upon the specific type of flash memory that is used. Sustaining device 16 is coupled between the AC power line 7 and the DC power output 7A of the power supply. In one embodiment, sustaining device 16 is a conventional capacitor, the value of which is selected based on the duration of time for which power must be maintained. However, sustaining device 16 can also be a battery or any other device which performs the aforementioned function.

Figure 14:
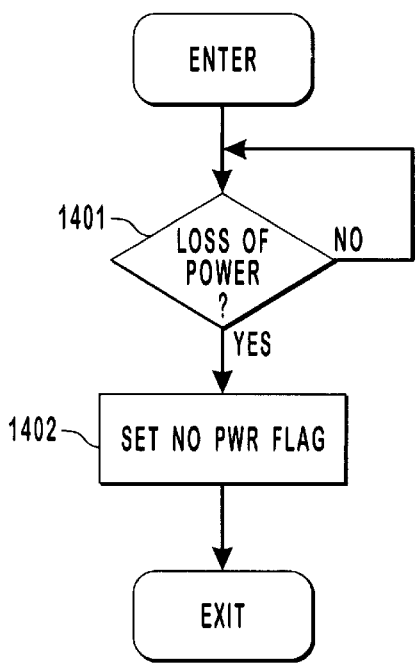
FIG. 14 is a flow diagram illustrating a routine for responding to a loss of power.

Power supply 8 also is capable of sensing a loss of AC power and outputting a corresponding signal, PWR OK, indicating whether or not AC power is present. The signal PWR OK is provided to the ASIC 20, as illustrated in FIG. 4. In the event of a loss of AC power, the signal PWR OK will immediately change status to indicate this occurrence. The signal PWR OK is used as input by the client system 1 to perform the routine of FIG. 14. That is, if a loss of power is detected in step 1401, then in step 1402 a NO PWR flag is set in the client system 1 to indicate this fact. The status of the power flag is repeatedly checked during the downloading process, as will now be described.

Figure 15:
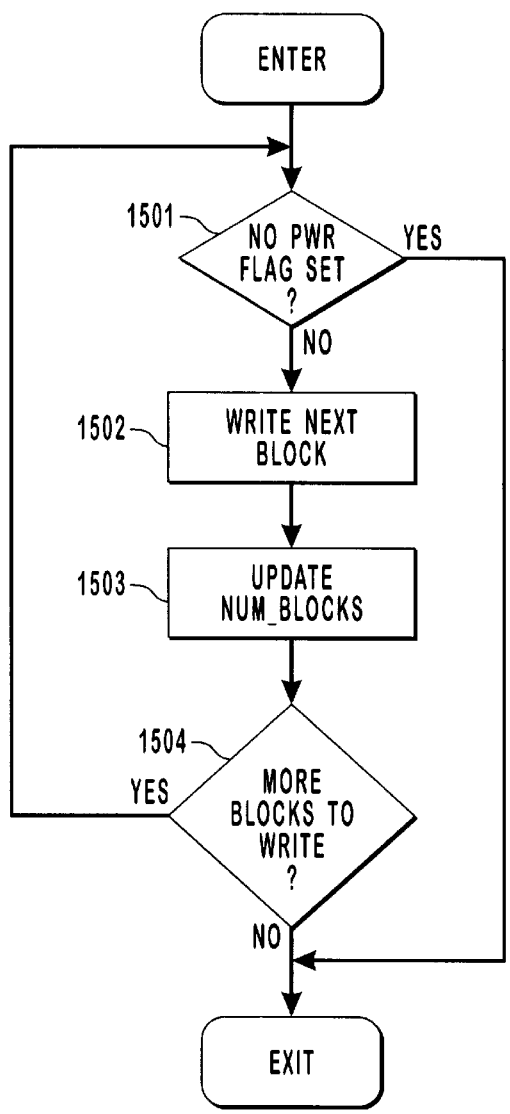
FIG. 15 is a flow diagram illustrating a routine for writing downloaded data into memory.

Referring now to FIG. 15, prior to writing any block of downloaded data into flash memory 22b, the status of the NO PWR flag is checked in step 1501. If the NO PWR flag has been set (in response to a change in the PWR OK signal), then the routine ends, such that no blocks of data are written thereafter. If the NO PWR flag has not been set, then the next block of data is written into the flash memory 22b in step 1508. A field NUM_BLOCKS is provided in flash memory 22b to indicate the number of blocks written into flash memory 22b so far. This field is updated in step 1503. If power is lost during the writing of the data block in step 1502, sustaining device 16 ensures that writing of the current block can be completed. If there are additional blocks to be written (step 1504), the routine repeats from step 1501 by checking the status of the NO PWR flag. Otherwise, the routine ends. Once power is restored and a connection to the server 5 is reestablished, downloading can be resumed. Because the number of blocks already written has been maintained in flash memory 22b (which can be verified using a checksum upon start-up), only those data blocks which had not yet been written into flash memory 22b are required to be downloaded. For the same reason, if the phone connection (or other communication link) with the transmitting server is lost or disrupted during a download, the download can be resumed from the last block written successfully, once the connection is re-established.

Thus, a method and apparatus are described for performing a remote upgrade of software over a network have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

Sample Configuration File

Below is a sample user information configuration file which is compatible with an embodiment of the present invention. The configuration file may include information about font sizes, bookmarks, user's keyboard type, color schemes, positioning of the display on the screen, number of distinct user accounts, electronic mail address, and local provider access numbers. It will be recognized by one of ordinary skill in the art that information may be added or removed from the configuration file as necessary without loss of compatibility with the present invention.

setup-major-version-color: 1
setup-minor-version-color: 4
setup-background-color: c6c6c6
setup-text-color: 0
setup-link-color: 2222bb
setup-visited-color: 8822bb
setup-keyboard: standard (QWERTY)
setup-font-sizes: medium
setup-play-songs: 1
setup-play-sounds: 1
setup-in-stereo: 1
setup-play-bgm: 0
setup-bgm-volume: 128
setup-bgm-tempo: −1
setup-advanced-options: 0
setup-city: Palo Alto
setup-state: CA
setup-zip: 94303

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. In a computer network that includes a plurality of servers each of which are connected either directly or logically to a plurality of client systems and other servers, and wherein at least some of the client systems include a television set which can be utilized as a display device, and an electronics unit for providing a graphical user interface electronically coupled to the television set and by which a user can access one or more web pages of the internet through connection to at least one of the servers, a method of automatically regenerating information at a client system without user intervention in the event of power disruption or disruption in communication between the client system and the server, the method comprising the steps of:

establishing a first communication session between a client system and the server;

prior to writing any block of downloaded data from the server to said client system, monitoring the status of the power connection at the client system and monitoring the status of the communication link between the client system and server;

if there is no disruption in the power connection or communication link at the client system, automatically to downloading data blocks from the server for storage at the client system; and if the power connection or communication link at the client system is disrupted, enabling a sustaining device to ensure that writing of any current block of data from the server is completed, and thereafter, upon resuming power connection or the communication link at the client system, resuming downloading of only those remaining data blocks from the server that had not yet been downloaded at the time of disruption.

2. As an article of manufacture, a computer program product for use in a computer network that includes a plurality of servers each of which are connected either directly or logically to a plurality of client systems and other servers, and wherein at least some of the client systems include a television set which can be utilized as a display device, and an electronics unit for providing a graphical user interface electronically coupled to the television set and by which a user can access one or more web pages of the internet through connection to at least one of the servers, a computer program product for implementing at a client system a method of automatically regenerating information at the client system without user intervention in the event of power disruption or disruption in communication between the client system and the server, the computer program product comprising:

a computer readable medium for carrying computer program code means; and wherein said computer program code means comprises:

first program code means for establishing a first communication session between a client system and the server;

second program code means for, prior to writing any block of downloaded data from the server to said client system, monitoring the status of the power correction at the client system and monitoring the status of the communication link between the client system and server;

third program code means for, if there is no disruption in the power connection or communication link at the client system, automatically downloading data blocks from the server for storage at the client system; and fourth program code means for, if the power connection or communication link at the client system is disrupted, enabling a sustaining device to ensure that writing of any current block of data from the server is completed, and thereafter, upon resuming power connection or the communication link at the client system, resuming downloading of only those remaining data blocks from the server that had not yet been downloaded at the time of disruption.

3. The article of manufacture of claim 2 further comprising:

program code means for causing the client system to use the downloaded data blocks to establish a second communication session with the server;

program code means for causing the client system to automatically download from the server user configuration information transmitted from the server upon establishing the second communication session; and program code means for causing the client system to store the downloaded user configuration information in a memory storage device within the client system.

4. The article of manufacture of claim 3 wherein the means for causing a computer to automatically download from the network user configuration information comprises means embodied in the computer usable medium for causing a computer to initiate the downloading step independently from any input from a user of the processing system.

5. The method of claim 4 wherein said step of automatically downloading data blocks comprises storing the data blocks in a programmable non-volatile memory.

6. The method of claim 5 wherein the programmable non-volatile memory comprises a flash memory.

7. The method of claim 4 wherein said step of automatically downloading data blocks comprises storing the data blocks in a disk drive.

8. The method of claim 4 wherein said data blocks contain information comprised of configuration parameters.

9. The method of claim 8 wherein the configuration parameters comprise communication parameters for enabling the client system to communicate with the server.

10. The method of claim 8 wherein the configuration parameters comprise telephone communication parameters for enabling the client system to communicate with the server via a telephone connection.

11. The method of claim 4 further comprising the steps of:

using the downloaded data blocks to establish a second communication session with the server;

upon establishing the second communication session, automatically downloading from the server user configuration information transmitted from the server; and storing the downloaded user configuration information in a memory storage device within the client system.

12. The article of manufacture of claim 2 wherein said third program code means comprises program code means for downloading the data blocks to a memory storage device comprised of a programmable non-volatile memory.

13. The article of manufacture of claim 12 wherein the programmable non-volatile memory comprises a flash memory.

14. The article of manufacture of claim 2 wherein said third program code means comprises program code means for downloading the data blocks to a memory storage device comprised of a disk drive.

15. The article of manufacture of claim 2 wherein the downloaded data blocks contain information comprised of configuration parameters.

16. The article of manufacture of claim 15 wherein the configuration parameters comprise communication parameters for enabling the client system to communicate with the server.

17. The article of manufacture of claim 15 wherein the configuration parameters comprise telephone communication parameters for enabling the client system to communicate with the server via a telephone connection.

* * * * *

UNITED STATES PATENT AND TRADEMARK OFFICE
CERTIFICATE OF CORRECTION

PATENT NO.    : 5,974,461
DATED         : October 26, 1999
INVENTOR(S)   : Phillip Y. Goldman, Bruce A. Leak, John Matheny It is certified that error appears in the above-identified patent and that said Letters Patent is hereby corrected as shown below:

Col. 7, ln. 23: after "downloaded" change "form" to --from--

Col. 8, ln. 42: after "illustrates a " change "portions" to --portion--

Col. 8, ln. 62: after "script" change "too" to --to--

Col. 10, ln. 60: after "which" and before "are not" delete [will]

Signed and Sealed this

Twenty-eighth Day of November, 2000

Attest:

Q. TODD DICKINSON

Attesting Officer

Director of Patents and Trademarks